Dec. 17, 1957   O. FIRING   2,816,648
ZIPPER TRIMMING TOOL WITH MEANS TO RESET
THE ELEMENTS OF THE TAPE
Filed April 12, 1956
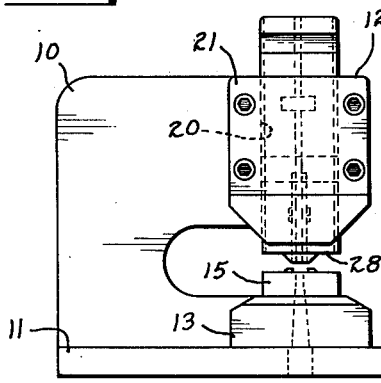
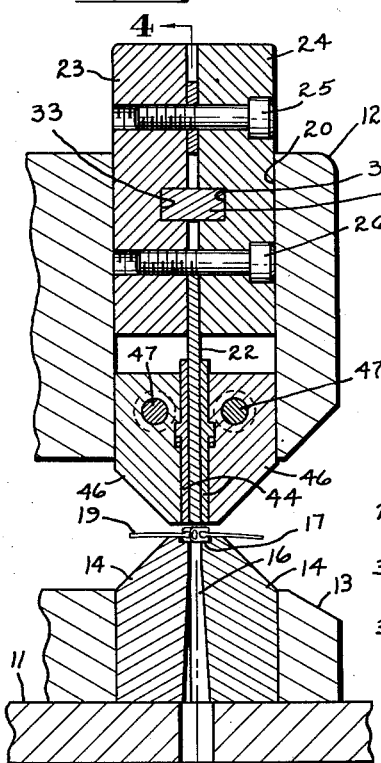
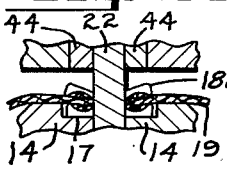
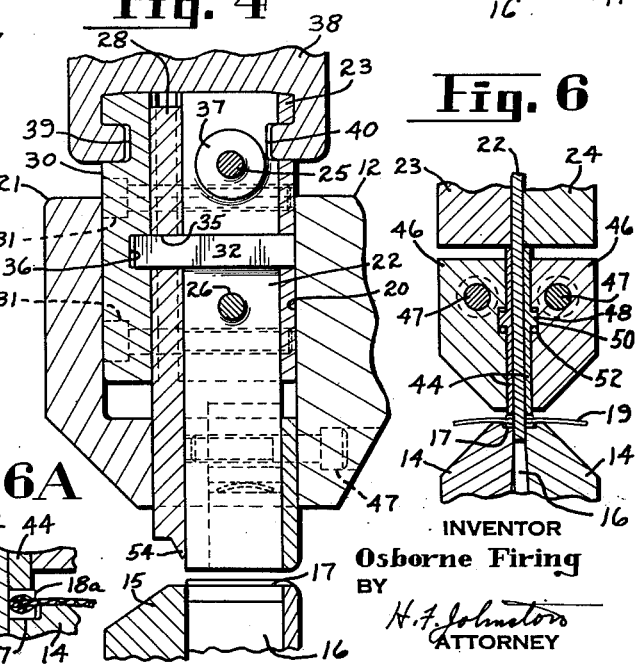
INVENTOR
Osborne Firing
BY
H. F. Johnston
ATTORNEY

United States Patent Office 2,816,648
Patented Dec. 17, 1957

2,816,648

ZIPPER TRIMMING TOOL WITH MEANS TO RESET THE ELEMENTS OF THE TAPE

Osborne Firing, Woodbury, Conn., assignor to Scovill Manufacturing Company, Waterbury, Conn., a corporation of Connecticut Application April 12, 1956, Serial No. 577,738

3 Claims. (Cl. 153—1)

This invention relates to improvements in the manufacture of slide fasteners and particularly to the tools that are employed for providing gap spaces on continuous chain.

In the manufacture of slide fastener stringers it is sometimes the practice to apply the fastener elements to the beaded edges of tapes as continuous chain and then remove groups of the elements to provide gaps or spaces through which the tapes may be cut to provide stringers of a prescribed length. The tools for cutting the gap space are adapted to cut through the heads of the elements on assembled chain in such a position that after the cutting operation the heads and gripping legs of the elements will fall away from the tape. Heretofore, in cutting the elements on the tapes it was difficult to register the assembled chain with the cutting blade to assure a clean cut of elements at the end of the gap space, consequently the blade would frequently cut through only one-half the width of an element at the end of the gap space leaving a mutilated element on the stringer and the cutting operation of the mutilated element would distort the legs of said element out of their normal position relative to the tape so that it was difficult to slip the zipper chain through the cutting tool and also later made it difficult and sometimes impossible to assemble the slider upon the stringers.

Accordingly it is an object of this invention to provide a cutting tool that will produce the usual gap space and also assure that any of the mutilated elements that are not completely sheared through will not project beyond their normal position above or below the tape.

Another object is to temporarily press the severed legs tightly against the tape so that the stringer may be easily moved out of the machine whereupon the severed portions of the elements will fall away from the tapes.

Another object is to accomplish the above results without expensive alterations of the tape-cutting machine or any extra work by the operator.

With these and other objects in view, the invention will be readily understood from the following detailed description of one preferred embodiment shown in the accompanying drawing, wherein:

Fig. 1 is an elevational side view of a zipper trimming and straightening machine embodying my invention.

Fig. 2 is a perspective view of the machine with portions of the supporting head and tools removed to better show the interior construction.

Fig. 3 is a cross sectional view through the head of the machine transverse to the guide channel through which the strips are fed showing the tools in normal inoperative position.

Fig. 4 is another sectional view through the machine taken along the line 4—4 of Fig. 3.

Fig. 5 is a sectional view similar to Fig. 3 of the cutting portion of the unit showing the shearing and the setting punch end of the machine.

Fig. 5A shows an enlarged view of the cutting end of the punch and die showing how the legs of the zipper element are distorted during the cutting operation.

Fig. 6 is a view similar to Fig. 5 showing the position of the tools for clamping distorted elements back to normal position.

Fig. 6A is an enlarged view of the clamping end of the setting tools, and

Fig. 7 is a perspective view of the tape stringers showing a gap space provided therein.

Referring now to the drawing in which like reference numerals denote like parts throughout the several views, the numeral 10 designates generally a machine frame having a base 11 and a head 12. The frame 10 is provided with a die holder 13 on its base within which is mounted a split element-cutting die 14 and a tape shearing anvil 15. A discharge opening 16 is formed between the mating faces of the split die 14 and the upper end is formed with a longitudinal guide channel 17 through which the elements 18 on a pair of stringer tapes 19 may be guided. The head 12 is provided with a vertical channel 20 in which all the tools for shearing the zipper elements, resetting the distorted or mutilated elements and cutting off the tape to length, operate as a unit and are retained within said channel by a cap 21.

The tool for shearing out a gap space in a connected series of elements on zipper stringers consists of a narrow shearing punch 22, clamped between a pair of punch holders 23 and 24 as by means of screws 25 and 26. Positioned against the left faces of the punch holders 23 and 24 and transversely to the shearing punch 22 is a tape cut-off blade 28 that is clamped against said faces by a retainer block 30 as by screws 31. The punch holders 23 and 24, the tape cut-off blade 28, the blade retainer block 30 are all held together against longitudinal displacement by a key 32 fitting in grooves 33 and 34 in the adjacent faces of said holders 23 and 24, in a through-opening 35 in said blade 28 and in a recess 36 on the inner face of said block 30. It will be noted from Figs. 3 and 4 that the upper edge of the shearing punch 22 abuts against the under surface of the key 32 and derives its driving force from said key. Inasmuch as the shearing punch 22 does not extend above the key 32 in the holders 23 and 24, a spacer washer 37 is positioned between said holders 23 and 24 and there held in place by the screw 25 which it surrounds. All the above parts interlocked by the key 32 may be driven by a plunger 38 interfitted in grooves 39 and 40 formed respectively in the upper ends of the punch holders 23 and 24 and the retainer block 30, and said plunger 38 may be driven by any suitable power press.

When the punch 22 operates to cut off the heads of the elements 18 to provide a gap space 41 in the zipper elements as shown in Fig. 7, the legs 18a of the elements for a time will remain on the beaded edges of the stringers and will be distorted out of their normal position as shown in Fig. 5a. Also usually one of the elements will have only a portion of its head cut off as shown at 42 in Fig. 7 and this element will remain on the tape. In order to reset these distorted elements, for reasons as will appear later, I provide a pair of element-clamping or resetting punches 44 that are positioned against opposite sides of the shearing punch 22 and are held thereagainst by a pair of opposed stripper blocks 46 secured to the machine head 12 as by screws 47. In timed relationship the resetting punches 44 operate after the shear punch 22. For this reason the punches 44 are provided with transverse ribs 48 that slidably engage in a pair of transverse channels 50 in the adjacent faces of the stripper blocks 46. It will be noted that the channels 50 are wider than the ribs 48 and these punches normally are held in their uppermost position with the upper edges of the ribs abutted against the upper edges of the channels 50 by a pair of arcuate wire springs 52 confined within said channels. The springs 52 are adapted to be tensioned between the lower edges of the channels 50 and the lower edges of the ribs 48. The above construction provides a lost motion connection between the shearing punch 22 and the resetting punches 44 for reasons as will appear later.

After the shearing punch 22 operates to provide a gap space in the zipper elements, the tape cut-off blade 28 operates to sever the tapes 19. For this purpose the lower end of the blade 28 is formed with a sharpened double tapered end 54 that abuts against the upper surface of the shearing anvil 15.

In the operation of the machine the stringer tapes 19 with zipper elements 18 thereon interlocked together will first be guided through the guide channel 17 in the upper end of the cutting die 14 to the desired position. The machine will then be set in operation and the shear punch 22 will first shear off the element heads as shown in Fig. 5 whereupon the punched out scrap material will pass downwardly through the discharge opening 16 between the cutting die 14. This shearing operation will provide the gap space in the stringers and as explained above this shearing operation will distort the legs of the elements 18 out of their normal gripping position on the beaded edges as best shown in Fig. 5A. As the punch 22 further descends, the resetting punches 44 will contact the sheared-off legs and also any multilated or distorted legs and reset them back to their normal position in line with the rest of the elements on the stringer tapes. After the resetting operation the tape cut-off blade 28 will descend and jam the tape against the top surface of the anvil 15 and cut it apart to the desired length.

The pressing of the sheared leg elements back to their normal position against the tape beads will cause the legs to be sufficiently embedded within said beads so as to cling thereto and thus facilitate the removing of the tapes from the channel 17 after which the severed legs of the elements will readily drop away from the beaded edges. Also the mutilated element 42 that remains on one of the stringers will likewise have its legs reset back to normal position and this will preclude any jamming or abnormal frictional engagement with the conventional slider used for operating the zippers.

One form of the invention is presented herein for the purpose of exemplification but it will be appreciated that the invention is susceptible of changes and other structural modified forms coming clearly within the scope of the appended claims.

I claim:

1. A tool for removing scoop elements from the beaded edge of the tapes of continuous chain, said tool comprising a die having a longitudinal channel through which the chain may be guided, a shear punch aligned and cooperating with said die to shear the heads of said scoop elements adjacent said beaded edges, a pair of setting punches one on each side of said shear punch, and means for operating said setting punches after the punch-shearing operation to reset any of the elements back against the tape that may have been mutilated and distorted out of normal position during the punch-shearing operation.

2. A tool for removing scoop elements from the beaded edges of the tapes of continuous chain, said tool comprising a frame having a head and a base, a die mounted on said base and having a longitudinal channel through which the chain may be guided, a shear punch aligned and cooperating with said die to shear the heads of said scoop elements adjacent said beaded edges, a pair of setting punches, a pair of stripper blocks secured to said head and holding said settting punches one on each side of said shear punch, means permitting limited vertical movement of said setting punches relative to said stripper blocks, and means for operating said setting punches after the punch-shearing operation to reset any of the elements back against the tape that may have been mutilated and distorted out of normal position during the punch-shearing operation.

3. A die and a tape-cutting anvil mounted on said base in side-by-side relationship, a punch holder reciprocally mounted in said head, a shear punch aligned and cooperating with said die to shear the heads of said scoop elements adjacent said beaded edges, a tape-cutting blade aligned with said anvil, means keying said shear punch and said cutting blade to said punch holder to operate as an integral unit, a pair of setting punches, a pair of stripper blocks secured to said head and holding said setting punches one each side of said shear punch, means providing a lost motion connection to permit limited vertical movement of said setting punches relative to said stripper blocks, and spring means urging said setting punches to their normal uppermost position, said setting punches being driven by said punch holder and functioning after the punch shearing operation to reset any of the elements back against the tape that may have been mutilated and distorted out of normal position during the punch-shearing operation.

References Cited in the file of this patent

UNITED STATES PATENTS

| | | |
|---|---|---|
| 2,205,616 | Chappius | June 25, 1940 |
| 2,384,144 | Voity | Sept. 4, 1945 |
| 2,563,454 | Brown | Aug. 7, 1951 |
| 2,708,968 | Soave | May 4, 1955 |